United States Patent
McGinnis et al.

(10) Patent No.: US 12,394,158 B1
(45) Date of Patent: Aug. 19, 2025

(54) CONTENT PLAYBACK BASED ON A PATH

(71) Applicant: Apple Inc., Cupertino, CA (US)

(72) Inventors: Allessandra E. McGinnis, San Francisco, CA (US); Kevin Lee, San Jose, CA (US); Connor A. Smith, Sunnyvale, CA (US); Jack R. Dashwood, San Francisco, CA (US); Luis R. Deliz Centeno, Fremont, CA (US)

(73) Assignee: Apple Inc., Cupertino, CA (US)

( * ) Notice: Subject to any disclaimer, the term of this patent is extended or adjusted under 35 U.S.C. 154(b) by 343 days.

(21) Appl. No.: 17/880,939

(22) Filed: Aug. 4, 2022

Related U.S. Application Data

(60) Provisional application No. 63/233,412, filed on Aug. 16, 2021, provisional application No. 63/305,813, filed on Feb. 2, 2022.

(51) Int. Cl.
   *G06T 19/00* (2011.01)
   *G02B 27/01* (2006.01)
   *G06T 7/70* (2017.01)

(52) U.S. Cl.
   CPC .......... *G06T 19/006* (2013.01); *G02B 27/017* (2013.01); *G06T 7/70* (2017.01); *G06T 19/003* (2013.01)

(58) Field of Classification Search
   None
   See application file for complete search history.

(56) References Cited

U.S. PATENT DOCUMENTS

| | | | |
|---|---|---|---|
| 8,213,749 B2 * | 7/2012 | Di Bernardo | G06F 16/29 701/472 |
| 9,185,062 B1 * | 11/2015 | Yang | H04N 23/633 |
| 10,284,753 B1 * | 5/2019 | Naik | H04N 13/279 |
| 10,460,700 B1 * | 10/2019 | Mendhekar | H04L 65/80 |
| 10,551,993 B1 * | 2/2020 | Sanocki | G06F 3/017 |
| 10,712,810 B2 | 7/2020 | Ibrahim et al. | |
| 10,944,971 B1 * | 3/2021 | Guardini | H04N 21/4728 |
| 11,250,617 B1 * | 2/2022 | Sempe | H04L 65/611 |
| 11,991,418 B1 * | 5/2024 | McCarty | H04N 21/47217 |
| 2006/0181966 A1 * | 8/2006 | Ohtsuka | G11B 27/329 386/E5.064 |
| 2006/0218617 A1 * | 9/2006 | Bradstreet | H04N 5/76 725/135 |

(Continued)

FOREIGN PATENT DOCUMENTS

WO   2020100166   5/2020

*Primary Examiner* — Martin Mushambo
(74) *Attorney, Agent, or Firm* — Thompson Hine LLP

(57) ABSTRACT

Various implementations present a playback session on an electronic device based on a viewer's position relative to a position of an object (e.g., a representation of a content creator) during the recording of content (e.g., a memory). For example, at a first device having a processor, a process may acquire content at a first device in a physical environment including a person, the content based on sensor data of the physical environment captured via one or more sensors, determine recorded positional data including positions of the first device associated with a path of the person as the first device is moved within the physical environment during the acquiring of the content, and provide the content for playback at a second device based on the acquired sensor data and the positional data.

25 Claims, 8 Drawing Sheets

(56) References Cited

U.S. PATENT DOCUMENTS

| | | | | |
|---|---|---|---|---|
| 2007/0247477 | A1* | 10/2007 | Lowry | H04N 13/341 |
| | | | | 345/629 |
| 2010/0245233 | A1* | 9/2010 | Hammarling | G06T 19/003 |
| | | | | 345/156 |
| 2012/0004956 | A1* | 1/2012 | Huston | G06Q 30/0241 |
| | | | | 705/14.1 |
| 2012/0075168 | A1* | 3/2012 | Osterhout | G06F 3/017 |
| | | | | 345/8 |
| 2012/0194418 | A1* | 8/2012 | Osterhout | G02B 27/0149 |
| | | | | 345/156 |
| 2013/0204675 | A1* | 8/2013 | Dobell | G06Q 10/06398 |
| | | | | 705/7.42 |
| 2013/0282446 | A1* | 10/2013 | Dobell | G06Q 10/06398 |
| | | | | 705/7.42 |
| 2016/0118080 | A1* | 4/2016 | Chen | G11B 27/005 |
| | | | | 386/344 |
| 2016/0227297 | A1* | 8/2016 | Bennett | H04N 21/25833 |
| 2017/0330398 | A1* | 11/2017 | Jordan | H04N 5/9201 |
| 2017/0372360 | A1* | 12/2017 | Duggal | G11B 27/105 |
| 2018/0275749 | A1* | 9/2018 | Yoon | G06F 3/017 |
| 2018/0293798 | A1* | 10/2018 | Energin | G06F 9/445 |
| 2018/0332226 | A1* | 11/2018 | Wissenbach | H04N 23/6812 |
| 2018/0332267 | A1* | 11/2018 | Hesla | H04N 5/9201 |
| 2018/0349700 | A1* | 12/2018 | Percuoco | G02B 27/017 |
| 2018/0373413 | A1* | 12/2018 | Sawaki | H04N 13/332 |
| 2019/0179145 | A1* | 6/2019 | Ibrahim | H04N 13/332 |
| 2019/0304170 | A1* | 10/2019 | Meilland | G06T 15/205 |
| 2019/0358525 | A1* | 11/2019 | Raghoebardajal | A63F 13/211 |
| 2020/0036909 | A1* | 1/2020 | Caspi | H04N 5/272 |
| 2020/0273235 | A1* | 8/2020 | Emami | G06T 7/50 |
| 2020/0273251 | A1* | 8/2020 | Palos | G06T 19/20 |
| 2022/0165037 | A1* | 5/2022 | Zavesky | H04L 67/131 |

* cited by examiner

CONTENT PLAYBACK BASED ON A PATH

CROSS-REFERENCE TO RELATED APPLICATIONS

This application claims the benefit of U.S. Provisional Application Ser. No. 63/233,412 filed Aug. 16, 2021, which claims the benefit of U.S. Provisional Application Ser. No. 63/305,813 filed Feb. 2, 2022, each of which is incorporated by reference herein in its entirety.

TECHNICAL FIELD

The present disclosure generally relates to electronic devices that use sensors to provide views during playback sessions, including views that include representations of one or more objects in the playback sessions.

BACKGROUND

Various techniques are used to represent a content creator as a they record content (e.g., a video). For example, a viewer may see representations of one or more objects, such as realistic or unrealistic representations of the creator (e.g., avatars), while viewing the recorded content during a playback session. For example, a content creator may be a docent making a video recording of him or herself speaking about an exhibit in a museum. A viewer of the content during a playback session may attempt to follow along a path traversed by the content creator during recording, but this may be inconvenient or difficult, especially if the viewer deviates to another area.

SUMMARY

Various implementations disclosed herein include devices, systems, and methods that provide a representation of one or more objects within an extended reality (XR) experience during a playback session. In an exemplary implementation, the representation of an object may include at least a portion of a representation of a content creator (e.g., an avatar). The XR experience presents recorded content (e.g., recorded video content, also referred to as a "memory"), such as a representation of content as recorded by the content creator, during a playback session.

During an example playback session (e.g., a viewer watching a memory recorded by a content creator), the positioning of the representation(s) (e.g., the representation of the content creator) is based on a viewer's position relative to a position of the content creator during the recording of the memory. The content may be recorded while tracking a position of a creator (e.g., docent's "path" walking in a museum), such that during playback, a viewer may view the memory as he or she proceeds along the same path, e.g., following the virtual docent or viewing from the docent's point of view. The viewer moves along the same path as the creator to control playback, e.g., to continue/pause experiencing the content, switch between space-based chapters, etc. The recording or supplemental content provided with the playback session may include indications (e.g., virtual arrows, spatial audio notifications, etc.) of where the path is so the viewer knows where to go to continue viewing the memory. Additionally, the playback session may provide indications about how far a viewer can deviate from a creator's intentions.

In general, one innovative aspect of the subject matter described in this specification can be embodied in methods, at a first device having a processor, that include the actions of obtaining content including recorded positional data associated with a path of an object within a physical environment during recording of the content by a second device, wherein the recorded positional data was obtained via one or more sensors on the second device during the recording, determining viewing positional data including positions of the first device as the first device is moved during playback of the content, and presenting the playback of the content based on the recorded positional data and the viewing positional data.

These and other embodiments can each optionally include one or more of the following features.

In some aspects, presenting the playback of the content includes determining a distance between the positions of the first device and the path, and presenting the playback of the content based on the determined distance exceeding a threshold. In some aspects, presenting the playback of the content is further based on user input. In some aspects, presenting the playback of the content includes presenting additional content associated with a different path of another object. In some aspects, presenting the playback of the content includes displaying guiding indicators to guide a viewer to move the first device to a new position associated with the path of the object.

In some aspects, the guiding indicators include a spatialized audio element that guides the viewer to the new position.

In some aspects, the content includes audio associated with the path of the object, and presenting the playback of the content includes playback of the audio associated with the path of the object.

In some aspects, the playback of the content is presented in a first presentation mode, the method further including in accordance with a determination to switch the first presentation mode to a second presentation mode, presenting the playback of the content in the second presentation mode. In some aspects, the playback of the content includes virtual content associated with the content that is presented within a view of the physical environment.

In some aspects, the virtual content includes a virtual avatar that guides a viewer to move the first device to a new position associated with the path of the object.

In some aspects, the object is the second device. In some aspects, the object is a person or another object that is tracked by the one or more sensors on the second device.

In some aspects, the recorded positional data includes a pose of a viewing direction of the second device. In some aspects, the recorded positional data includes spatially-based bookmarks associated with the physical environment. In some aspects, the recorded positional data includes playback criteria associated with the physical environment and the playback of the content is based on the playback criteria.

In some aspects, the content is generated based on recorded data from the second device and recorded data from a plurality of other devices. In some aspects, the content includes an image, video, or 3D reconstruction of the physical environment obtained via the one or more sensors on the second device during the recording.

In some aspects, the content includes one or more virtual objects associated with the physical environment.

In some aspects, the content includes a representation of a user of the second electronic device during the recording.

In some aspects, the playback of the content is presented in an extended reality (XR) environment. In some aspects, the first device or the second device is a head-mounted device (HMD).

In general, another innovative aspect of the subject matter described in this specification can be embodied in methods, at a first device having a processor and one or more sensors, that include the actions of acquiring content in a physical environment including a person, the content based on sensor data of the physical environment captured via the one or more sensors, determining recorded positional data including positions of the first device associated with a path of the person as the first device is moved within the physical environment during the acquiring of the content, where the recorded positional data was obtained via the one or more sensors while acquiring the content, and providing the content for playback at a second device based on the acquired sensor data and the positional data.

These and other embodiments can each optionally include one or more of the following features.

In some aspects, acquiring the content includes obtaining spatial data of a scene in the physical environment. In some aspects, determining recorded positional data includes determining estimated pose information of the person relative to the position of the first device in the physical environment. In some aspects, providing the content for playback includes providing a representation of the person in place of a view of the person.

In some aspects, the representation of the person is based on physiological data of the person obtained via the one or more sensors. In some aspects, at least a portion of the person includes facial movements as the first device is moved within the physical environment during the acquiring of the content, and the representation of the person mimics the facial movements.

In some aspects, providing the content for playback includes providing different viewing modes based on playback capabilities of the second device. In some aspects, providing the content for playback includes providing different viewing modes based on a recording quality of the first device. In some aspects, the content includes audio associated with the path of the person and providing the content for playback includes providing the audio associated with the path of the person. In some aspects, providing content for playback includes providing additional content associated with a different path of another object.

In some aspects, providing content for playback includes providing guiding indicators to guide a viewer to move the second device to a new position associated with the path of the person. In some aspects, the guiding indicators include a spatialized audio element that guides the viewer to the new position.

In some aspects, the recorded positional data includes a pose of a viewing direction of the first device. In some aspects, the recorded positional data includes spatially-based bookmarks associated with the physical environment.

In some aspects, the playback of the content is presented in an extended reality (XR) environment. In some aspects, the first device or the second device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
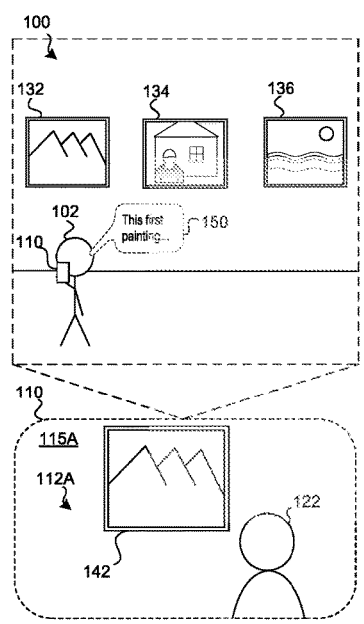
FIGS. 1A-1C illustrate exemplary views of an electronic device recording content over a path traversed by a content creator, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
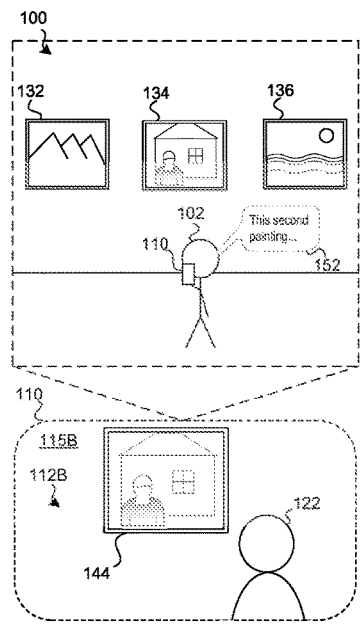
Figure 1C:
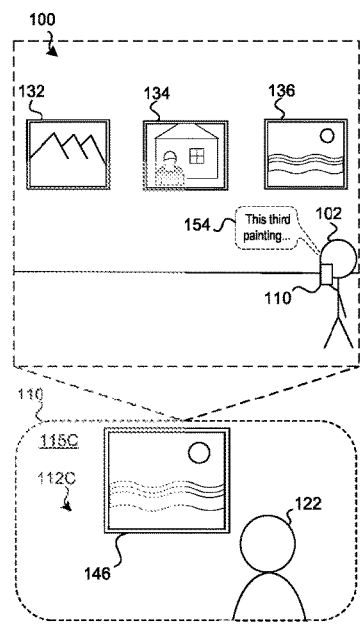

FIGS. 1A-1C illustrate exemplary views of an electronic device recording content over a path traversed by a content creator, where each view is a representation of the content recorded by the electronic device along the path in accordance with some implementations. For instance, FIGS. 1A-1C illustrate an exemplary electronic device 110 providing view 115A of 3D environment 112A, view 115B of 3D environment 112B, and view 115C of 3D environment 112C, respectively, operating in a physical environment 100 during a recording of content. For example, FIGS. 1A-1C may represent a recording at three different periods of time while the user 102 records content of the physical environment 100. In these examples of FIGS. 1A-1C, the physical environment 100 is a room (e.g., a particular room or exhibit of a museum) that includes a first wall hanging 132, a second wall hanging 134, and a third wall hanging 136. In particular, FIG. 1A of physical environment 100, for a first period of time, illustrates user 102 (e.g., a content creator, such as a docent recoding a tour of a museum) standing in front of and providing a narration 150 about the first wall hanging 132 (e.g., "This first painting . . . "). FIG. 1B of physical environment 100, for a second period of time, illustrates user 102 standing in front of and providing a narration 152 about the second wall hanging 134 (e.g., "This second painting . . . "). FIG. 1C of physical environment 100, for a third period of time, illustrates user 102 standing in front of and providing a narration 154 about the third wall hanging 136 (e.g., "This third painting . . . ").

The electronic device 110 includes one or more cameras, microphones, depth sensors, or other sensors that can be used to capture information about and evaluate the physical environment 100 and the objects within it, as well as information about the user 102 of the electronic device 110 (e.g., positional data of the user 102). The information about the physical environment 100 and/or user 102 may be used to provide visual and audio content during the playback session. For example, a playback session may provide views (e.g., views 115A, 115B, and 115C) of a 3D environment (e.g., 3D environment 112A, 112B, and 112C) that is generated based on camera images and/or depth camera images of the physical environment 100 and, optionally, a representation 122 of user 102 based on camera images and/or depth camera images of the user 102 (e.g., while the user 102 records a video of himself or herself). In other examples, a representation 122 of user 102 may be based on camera images and/or depth camera images from a different set of cameras than used to record the 3D environment. For example, a set of forward-facing cameras on an HMD may be used to capture 2D or 3D video of physical environment 100, while a second set of cameras may be used to track the user's 102 facial expressions, body pose, or the like. In some implementations, the electronic device 110 records and shares information with another device (e.g., a viewer device), or an intermediary device such as a playback session server.

In some implementations, the recorded positional data of the user 102 includes a pose of a viewing direction of the device 110. For example, a viewer can view the same pose and viewing direction as intended by the user 102 that created the content (e.g., a docent recording a tour using device 110). In some implementations, determining recorded positional data includes determining estimated pose information of the user 102 relative to the position of the user 102 in the physical environment 100. For example, the device 110 can capture skeletal pose information/estimation of the user 102 relative to the physical environment know what the tour guide has done relative to the physical environment 100 (e.g., the museum).

In the example illustrated in FIG. 1A, the electronic device 110 provides a view 115A that includes a representation 142 of the first wall hanging 132 and a representation 122 (e.g., a generated avatar, an image, a video, etc.) of at least a portion of the user 102 (e.g., from mid-torso up) within a 3D environment 112A. Similarly, in the example illustrated in FIG. 1B, the electronic device 110 provides a view 115B that includes a representation 144 of the second wall hanging 134 and the representation 122 within a 3D environment 112B, and in the example illustrated in FIG. 1C, the electronic device 110 provides a view 115C that includes a representation 146 of the third wall hanging 136 and the representation 122 within a 3D environment 112C. In some implementations, as the user 102 moves around, makes hand gestures, and makes facial expressions, corresponding movements, gestures, and expressions may be displayed for the representation 122 in each view 115. In other implementations, the views 115 of the 3D environment may not include a representation 122 of the user 102 (e.g., when user 102 records a video of physical environment 100 without recording him/herself).

While the example of FIGS. 1A-1C shows a user 102 recording content within a physical environment 100, it should be appreciated that content may be recorded within other types of 3D environments. For example, a recording session may involve user 102 or a representation 122 of user 102 positioned within an entirely virtual environment or an extended reality (XR) environment that includes some physical environment representations and some virtual environment representations. In some implementations, the recording environment of a recording session may be generated using 3D content creation tools and may not be based solely on camera images and/or depth camera images of a physical environment. For example, user 102 may provide and record a tour of a completely virtual environment including a typical street from New York City in the 1800s. In this example, the virtual street may have been created using a 3D content creation tool and the recorded content may only include views of this virtual street or may optionally include information obtained from cameras, microphones, depth sensors, or other sensors to, e.g., provide a visual and audible representation of user 102 as they recorded the content. In another example, user 102 may provide and record a tour of a physical museum, but may include a virtual object, such as a virtual map or information card, near a physical painting to aid in the understanding of what is being viewed. In this example, the recorded content may include images, video, or a 3D reconstruction of the physical museum, physical painting, and user 102 obtained from one or more cameras, depth sensors, or the like, as well as the virtual content (e.g., virtual map or information card) positioned relative to the physical environment. The playback session environment is further described herein with reference to FIGS. 3A-3C.

In some implementations, each 3D environment 112 is an XR environment that is based on a coordinate system that can be shared with other users (e.g., a virtual room for avatars for a multi-person playback session). In other words, the coordinate system of the 3D environment 112 is different than the coordinate system of the physical environment 100 for user 102 (e.g., a generated avatar of content creator may be viewed differently with respect to another object).

In some implementations, the representation 122 of user 102 (e.g., the content creator, such as a docent) may be realistic or unrealistic and/or may represent a current and/or prior appearance of the user 122. For example, a photorealistic representation of the user 102 may be generated based on a combination of live images and prior images of the user. The prior images may be used to generate portions of the representation 122 for which live image data is not available (e.g., portions of a user's face that are not in view of a camera or sensor of the electronic device 110 or that may be obscured, for example, by a headset or otherwise). In one example, the electronic device 110 is a head mounted device (HMD) and live image data of the user's face includes a downward facing camera images of the user's checks and mouth and inward facing camera images of the user's eyes, which may be combined with prior image data of the user's other portions of the user's face, head, and torso that cannot be currently observed from the sensors of the device 110. Prior data regarding a user's appearance may be obtained at an earlier time during the playback session, during a prior use of the electronic device, during an enrollment process used to obtain sensor data of the user's appearance from multiple perspectives and/or conditions, or otherwise.

Some implementations provide authored content that includes a representation of at least a portion of a user within a 3D environment and, based on detecting a condition, may also include a representation of another object of the user's physical environment to provide context. For example, during the recording of content for a playback session illustrated in FIGS. 1A-1C, representations of one or more other objects of the physical environment 100 may be displayed in each view 115. For example, based on determining that the user 102 is interacting with a physical object in physical environment 100, a representation (e.g., realistic or proxy) may be displayed in each view 115 to provide context for the interaction of the user 102 (e.g., a docent referring to particular painting or statue in a museum as he or she creates their "path" through an exhibit or a particular room in the museum).

In use, FIGS. 1A-1C illustrate authoring guided content by embedding a creator's movement, gestures, and speech into a scene. For example, for a docent to record a museum tour, the creator can record their body pose, voice, facial expression, or other data (e.g., location information) relative to the environment around them. This data can later be reconstructed such that a digital copy (e.g., a digital docent) can be summoned at any time to re-play the recorded tour, without the original docent needing to be present. Thus, when the digital tour is replayed, only a digital component of the docent (e.g., an avatar) is provided to the viewer to give the tour. In other words, in order for a creator (e.g., a docent) to create a digital tour, he or she only needs to hit a "record" button, perform the tour once, and their performance is captured permanently relative to the scene.

In some implementations, positional data is recorded that identifies 6 degrees of freedom (6 DoF) positional information of the user 102 within the physical environment 100. For example, the 6 DoF positional information may be utilized to record where the user 102 is standing, which direction the user 102 is facing, etc. In one example, the user 102 (e.g., the creator) may be a docent recording a tour in a museum while holding a device that records images of the user 102 giving the tour as well as positional data about user 102 as the he or she gives the tour, which is being recorded. The recorded content and positional data may be associated with one another for later use generating 3D content such as a playback view (e.g., 2D or 3D) of the user 102 giving the tour. The use of the recorded content (e.g., images, depth, etc.) and positional data may enable a playback view at the same location and/or orientation within the same physical environment 100. The positional data may define rooms, space-based bookmarks, space-based playback criteria. The recorded positional data was obtained via one or more sensors on the device 110 during the recording.

In some implementations, the representation 122 of the user 102 (e.g., an avatar) recording content on device 110 (e.g., a docent recording a museum tour) is based on physiological data of the user 102 obtained via the one or more sensors. For example, device 110 may include physiological sensors (e.g., heart rate, eye gaze, etc.) that can detect the user 102 (e.g., the docent recording a museum tour) is happy and therefore the generated avatar (e.g., the representation 122 of user 102) can mimic a person as smiling/happy. In some implementations, at least a portion of the user 102 includes facial movements as the device 110 is moved within the physical environment during the acquiring of the content, and the representation 122 of the user 102 mimics the facial movements. For example, camera sensors can detect the user 102 (e.g., the docent recording a museum tour) is smiling and therefore the generated avatar (e.g., the representation 122 of user 102) can mimic the smile.

Figure 2:
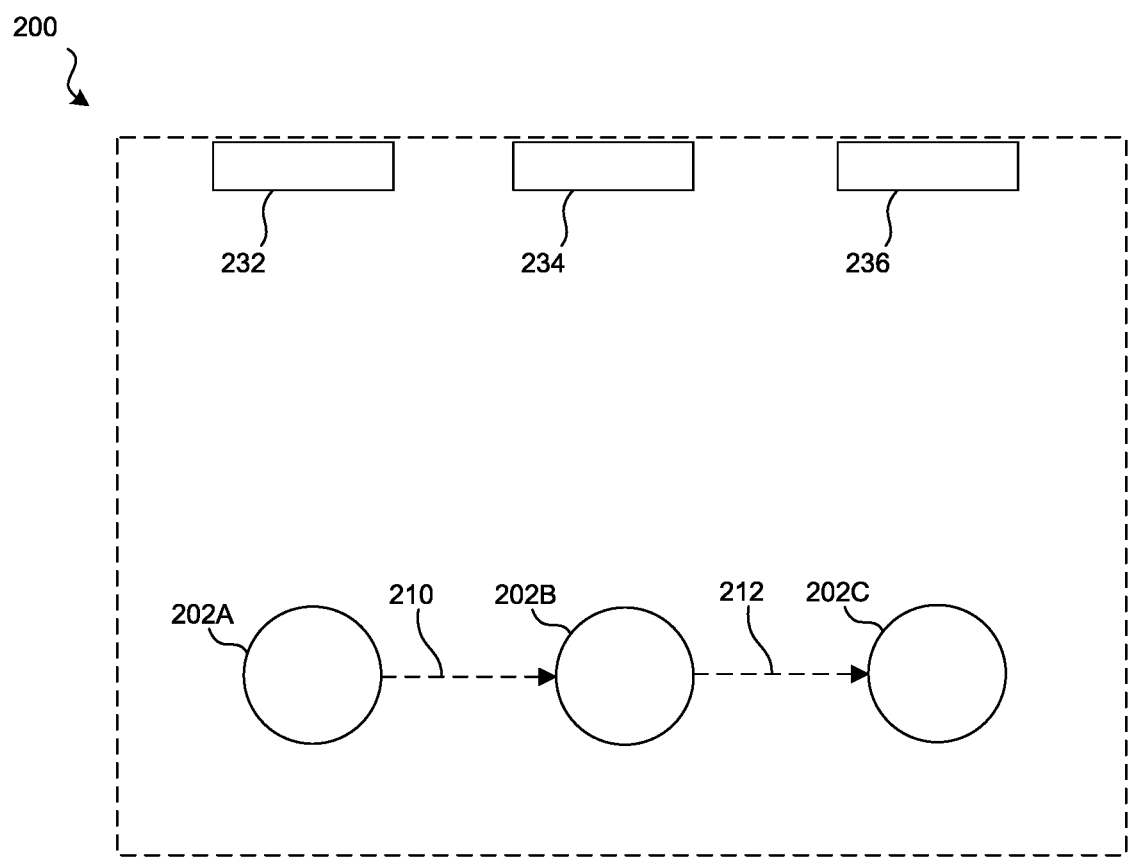
FIG. 2 illustrates an example location map based on the movement of the content creator along a path of FIGS. 1A-1C in accordance with some implementations.

FIG. 2 illustrates an example location map 200 based on the movement of the content creator (e.g., user 102) of FIGS. 1A-1C along a path (e.g., path segment 210 and path segment 212) in accordance with some implementations. A location map illustrates a two dimensional (2D) top-down view of locations of representations of users or other representations of objects within a 3D environment. In this example, during an example of recording content for a playback session (e.g., the recorded content of FIGS. 1A-1C within the 3D environment 112A-112C, respectively), a recording or playback session instruction set executed on an electronic device (e.g., device 110), or networked through an external server, can generate a location map 200 based on the representations of the user 102, and objects (e.g., first wall hanging 132, second wall hanging 134, and third wall hanging 136). For example, location indicator 232 depicts a location for representation 142 of first wall hanging 132, location indicator 234 depicts a location for representation 144 of second wall hanging 134, and location indicator 236 depicts a location for representation 146 of third wall hanging 136 for the recorded content illustrated in FIGS. 1A-1C. The location map 200 further illustrates the respective placement for the user representation 202A as the user 102 moves during each respective time period. For example, as the user 102 moves to the second location illustrated in FIG. 1B (e.g., in front of the second wall hanging 134), the location map 200 illustrates path segment 210 of the movement of the user 102 to the location at representation 202B, and as the user 102 moves to the third location illustrated in FIG. 1C (e.g., in front of the third wall hanging 136), the location map 200 illustrates path segment 212 of the movement of the user 102 to the location at representation 202C.

Figure 3A:
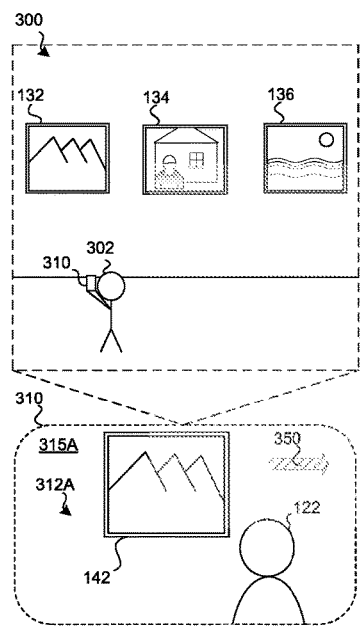
FIGS. 3A-3C illustrate exemplary views of an electronic device during a playback session over a path traversed by a viewer, in accordance with some implementations.
Figure 3B:
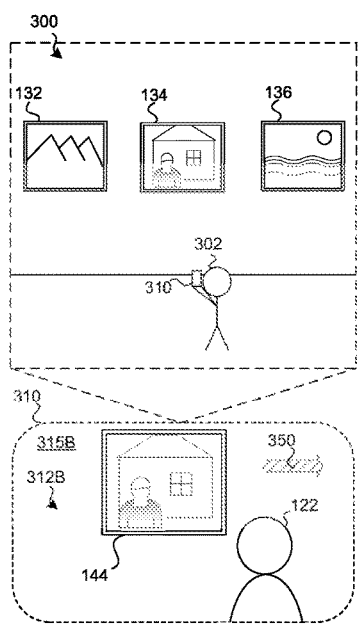
Figure 3C:
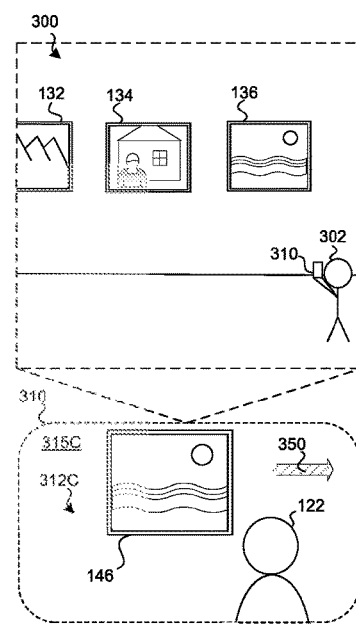

FIGS. 3A-3C illustrate exemplary views of an electronic device during a playback session along a path traversed by a viewer, where each view is of an extended reality (XR) environment that includes a representation of the content creator of FIGS. 1A-1C along the path, and a portion of the physical environment, in accordance with some implementations. For instance, FIGS. 3A-3C illustrate an exemplary electronic device 310 providing view 315A of 3D environment 312A, view 315B of 3D environment 312B, and view 315C of 3D environment 312C, respectively, operating in the same physical environment 100 as FIGS. 1A-1C during a viewing of content during a playback session. For example, FIGS. 3A-3C may represent a playback session at three different periods of time while the user 302 walks along a path (e.g., a similar path as user 102 during the recording of content) in the physical environment 100. In particular, FIG. 3A, for a first period of time, illustrates user 302 (e.g., a viewer such as a visitor watching a recording of a tour of a museum that was previously recorded by a docent) standing in front of the first wall hanging 132. FIG. 3B, for a second period of time, illustrates user 302 standing in front of the second wall hanging 134. FIG. 1C, for a third period of time, illustrates user 302 standing in front of the third wall hanging 136.

The electronic device 310 includes one or more cameras, microphones, depth sensors, or other sensors that can be used to capture information about and evaluate the physical environment 100 and the objects within it, as well as information about the user 302 of the electronic device 310 (e.g., positional data of the user 302). The information about the physical environment 100 and/or user 302 may be used to provide visual and audio content during the playback session. For example, a playback session may provide views of a 3D environment (e.g., 3D environment 312A, 312B, and 312C) that is generated based on current camera images and/or depth camera images of the physical environment 100 from electronic device 310 as well as a representation 122 of user 102 (e.g., from FIGS. 1A-1C) based on camera images and/or depth camera images of the user 102 (e.g., while the user 102 records a video of himself or herself) captured by electronic device 110 at the time the content was recorded.

In the example illustrated in FIG. 3A, the electronic device 310 provides a view 315A that enables user 302 to view a representation 142 of the first wall hanging 132 and a representation 122 (e.g., a generated avatar, an image, a video, etc.) of at least a portion of the user 102 (e.g., from mid-torso up) within a 3D environment 312A. For example, the representation 122 is a recording of a docent providing a recorded video or avatar that teaches the user 302 about the first wall hanging 132. Similarly, in the example illustrated in FIG. 3B, the electronic device 310 provides a view 315B that enables user 302 to view a representation 144 of the second wall hanging 134 and the representation 122 within a 3D environment 312B, and in the example illustrated in FIG. 3C, the electronic device 310 provides a view 315C that enables user 302 to view a representation 146 of the third wall hanging 136 and the representation 122 within a 3D environment 312C.

Additionally, each view 315 includes an indicator 350 to guide the user to follow a similar path as the recorded content from the content creator (e.g., user 102 of FIG. 1, such as a docent during a guided tour of a museum). Because the content recorded only follows a particular path, the indicator 350 ensures that the viewer (e.g., user 302) stays on a path that is aligned with the recorded content, otherwise, if the user 302 deviates from the path, there will likely not be any recorded content to present to user 302 (e.g., the representation 122 of user 102 (and the associated audio of the tour)). The indicator 350, as illustrated, may be a virtual arrow pointing in a direction of the path that is intended for the user 302 to follow. However, in other examples, other visual indicators may be used to direct user 302 along the path associated with the recorded content. Additionally, or alternatively, spatialized audio may be used for the indicator 350 to direct the user along the path (e.g., "walk towards the direction of the next painting to the right").

In some implementations, a view (e.g., view 315) may include an interactive element (e.g., a selectable virtual icon). For example, indicator 350 may be an interactive element (or several different elements) that the user can use to control different portions of the experience via user input. For example, the user can stop, pause, rewind, fast forward, skip a chapter, etc., through a particular portion of content. Additionally, or alternatively, the user can use voice control to interact with the interactive elements or to control the viewing of the content during the experience (e.g., "skip this portion of the museum tour.").

In some implementations, the system may allow a user to update user settings to indicate that the user may be mobility limited (e.g., in a wheelchair), and therefore cannot proceed directly along the intended path. For example, a distance threshold may be removed or altered if the user can't follow the path exactly as intended because he or she needed to follow a handicap path (e.g., going down a ramp instead of the stairs that the docent used during the tour of the museum). Additionally, or alternatively, the user settings may allow a user to let the system know there maybe too many people that are blocking the intended path, or other environmental blockers that the user needs to navigate and deviate from the intended path. Alternatively, the electronic device 310 can automatically determine that there are environmental blockers (e.g., a crowded event) that requires the user to deviate from the path (e.g., via image data and an object detection algorithm).

In some implementations, each 3D environment 312 is an XR environment that is based on a coordinate system that can be shared with other users (e.g., a virtual room for avatars for a multi-person playback session). In other words, the coordinate system of the 3D environment 312 is different than the coordinate system of the physical environment 100 for user 302 (e.g., a generated avatar of content creator may be viewed differently with respect to another object). For example, the user 102 (e.g., the docent) may have recorded him or herself at a different position relative to one of the paintings (e.g., at a first position), however, the 3D environment 312 may position the representation 122 at a different position relative to one of the paintings (e.g., at a second position). For example, there may be an obstructed view for user 302 while viewing the representation 122, such as another visitor of the museum looking at the same painting. Thus, a playback session instruction set may be able to move the position of the representation 122 to a different coordinate with the view 315 of the 3D environment 312.

In some implementations, the recorded content in each 3D environment 312 may entirely occupy the field of view for the user 302 (e.g., a fully immersive experience while wearing an HMD). For example, view 315 may include content (e.g., images, video, 3D reconstructions, or the like) from physical environment 100 captured by electronic device 110 at the time of recording. In this example, view 315 may not include a view of physical environment 100 at the time of playback (e.g., via pass-through video captured by electronic device 310 or as seen through a transparent/translucent display). Alternatively, in some implementations, the recorded content in each 3D environment 312 may only occupy a portion of the entire field of view for the user 302. For example, view 315 may include content (e.g., images, video, 3D reconstructions, or the like) from physical environment 100 or a representation 122 of user 102 captured by electronic device 110 at the time of recording. In this example, the view may also include a view of physical environment 100 (e.g., via pass-through images captured by electronic device 310 or as seen through a transparent/translucent display) at the time of playback over which the recorded content is overlaid.

Figure 4:
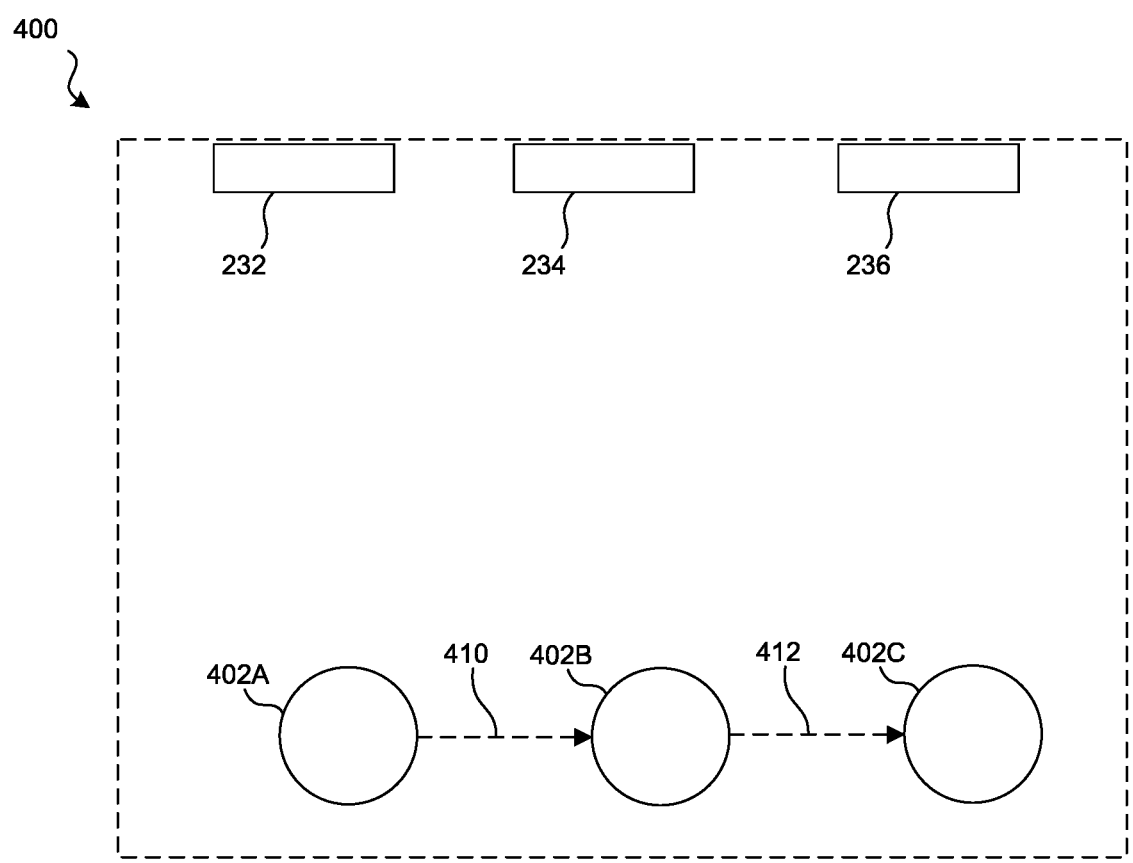
FIG. 4 illustrates an example location map based on the movement of the viewer along a path of FIGS. 3A-3C in accordance with some implementations.

FIG. 4 illustrates an example location map 400 based on the movement of a viewer (e.g., user 302) of FIGS. 3A-3C along a path (e.g., path segment 410 and path segment 412) in accordance with some implementations. A location map illustrates a two dimensional (2D) top-down view of locations of representations of users or other representations of objects within a 3D environment. In this example, during an example of a playback session of recorded content (e.g., a portion of the recorded content of FIGS. 1A-1C within the 3D environment 112A-112C, respectively), a playback session instruction set executed on an electronic device (e.g., device 310), or networked through an external server, can generate a location map 400 based on the representations of the user 302, and objects (e.g., first wall hanging 132, second wall hanging 134, and third wall hanging 136). For example, location indicator 232 depicts a location for representation 142 of first wall hanging 132, location indicator 234 depicts a location for representation 144 of second wall hanging 134, and location indicator 236 depicts a location for representation 146 of third wall hanging 136 for the recorded content illustrated in FIGS. 1A-1C. The location map 400 further illustrates the respective placement for the user representation 402A as the user 302 moves during each respective time period. For example, as the user 302 moves to the second location illustrated in FIG. 3B (e.g., in front of the second wall hanging 134), the location map 400 illustrates path segment 410 of the movement of the user 302 to the location at representation 402B, and as the user 302 moves to the third location illustrated in FIG. 3C (e.g., in front of the third wall hanging 136), the location map 400 illustrates path segment 412 of the movement of the user 302 to the location at representation 402C.

Figure 5A:
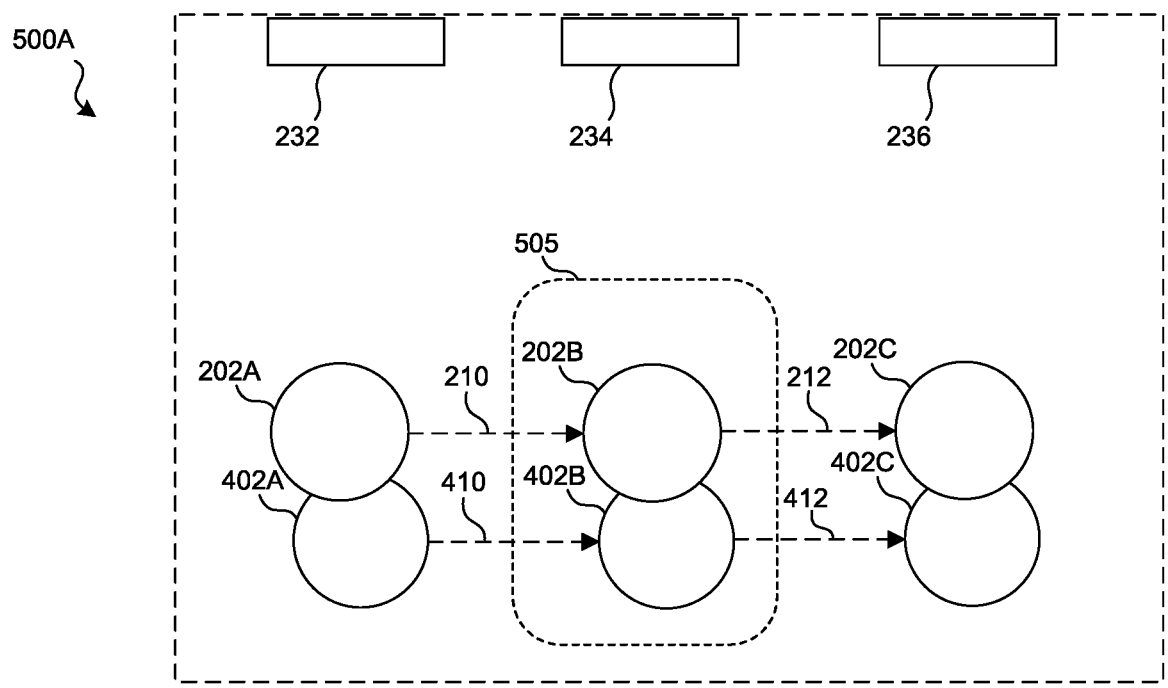
FIG. 5A illustrates an example location map based on the movement of the content creator along a path of FIGS. 1A-1C and the viewer along a path of FIGS. 3A-3C in accordance with some implementations.

FIG. 5A illustrates an example location map 500A based on the movement of the content creator (e.g., user 102) along a path (e.g., path segment 210 and path segment 212) of FIGS. 1A-1C and the viewer (e.g., user 302) along a path (e.g., path segment 410 and path segment 412) of FIGS. 3A-3C in accordance with some implementations. Location map 500A illustrates an example process of a playback session instruction set to analyze a location of the viewer with respect to the location of the recorded content to ensure the viewer is within a threshold distance of the path of the content creator. For example, a playback session instruction set shows the recorded content (e.g., representation 122 of user 102 such as a docent providing a guided tour of a museum) if the viewer is within a certain distance of the same path of the content creator and/or within a distance of the object (e.g., the first wall hanging 132) the content creator is speaking about. In particular, at area 505, a playback session instruction set analyzes the location of the viewer as he or she moves in the museum to make sure they are following the intended path (e.g., the path as shown to the user 302 by indicator 350).

Figure 5B:
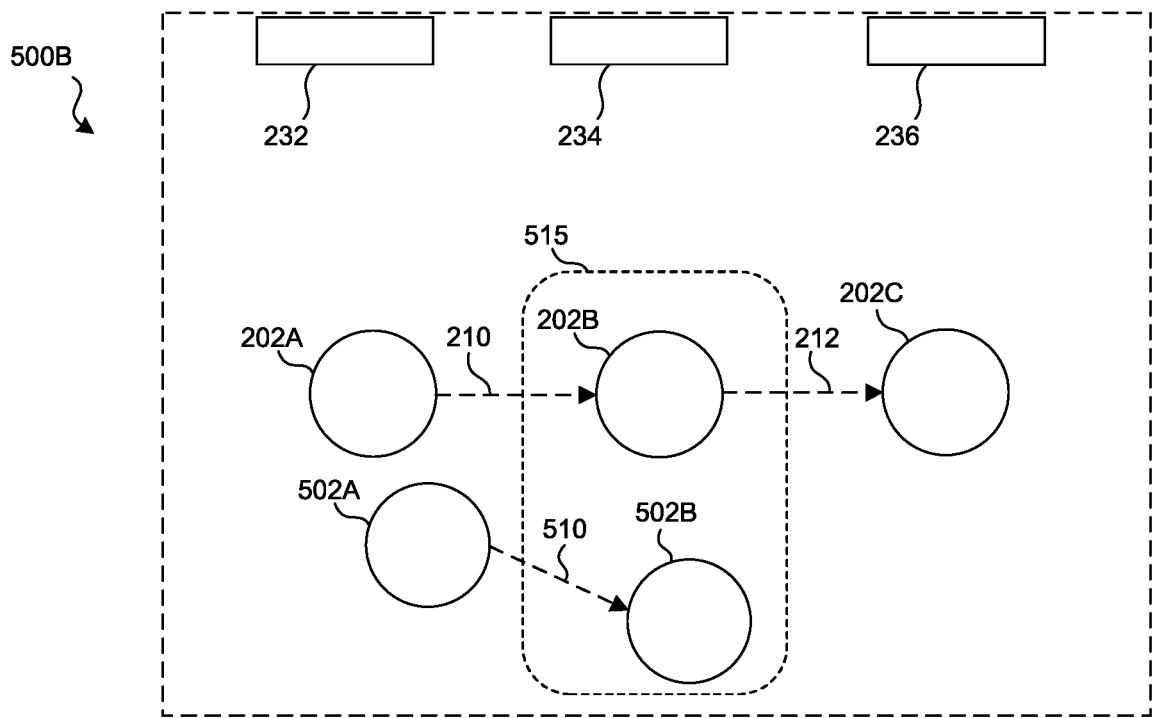
FIG. 5B illustrates an example location map based on the movement of the content creator along a path of FIGS. 1A-1C and a viewer taking a different path than the viewer of FIGS. 3A-3C in accordance with some implementations.

FIG. 5B illustrates an example location map 500B based on the movement of the content creator along a path (e.g., path segment 210 and path segment 212) of FIGS. 1A-1C and a viewer taking a different path (e.g., path segment 510) than the viewer of FIGS. 3A-3C in accordance with some implementations. Location map 500B illustrates an example process of a playback session instruction set to analyze a location of the viewer with respect to the location of the recorded content to ensure the viewer is within a threshold distance of the path of the content creator. For example, a playback session instruction set shows the recorded content (e.g., representation 122 of user 102 such as a docent providing a guided tour of a museum) if the viewer is within a certain distance of the same path of the content creator and/or within a distance of the object (e.g., the first wall hanging 132) the content creator is speaking about. In particular, at area 515, a playback session instruction set analyzes the location of the viewer as he or she moves in the museum to make sure they are following the intended path (e.g., the path as shown to the user 302 by indicator 350). However, in contrast to FIG. 5A, the viewer at path segment 510 in FIG. 5B, as illustrated by location map 500B, deviates from the intended path, as shown at area 515. Thus, the playback session instruction set may then stop showing the recorded content (e.g., stop presenting the representation 122—the guided tour by a docent) based on the deviation. Additionally, or alternatively, the playback session instruction set can update the indicator 350 to instruct the user of the deviation and guide the viewer back to within a threshold distance of the intended path of the recorded content.

In some implementations, there may be additional recorded content for other areas of the physical environment that are not included in the first path the viewer started on. For example, if the viewer at path segment 510 is instead turned around and facing a different exhibit, or a different wall that includes a fourth painting, the playback session instruction set may provide additional recorded content (e.g., a different recorded video by the docent that pertains to the different exhibit).

In the example of FIGS. 1-5, the electronic devices 110, 310 are illustrated as a hand-held device. The electronic devices 110, 310 may be a mobile phone, a tablet, a laptop, and so forth. In some implementations, electronic devices 110, 310 may be worn by a user. For example, electronic devices 110, 310 may be a watch, a head-mounted device (HMD), head-worn device (glasses), headphones, an ear mounted device, and so forth. In some implementations, functions of the devices 110, 310 are accomplished via two or more devices, for example a mobile device and base station or a head mounted device and an ear mounted device. Various capabilities may be distributed amongst multiple device, including, but not limited to power capabilities, CPU capabilities, GPU capabilities, storage capabilities, memory capabilities, visual content display capabilities, audio content production capabilities, and the like. The multiple devices that may be used to accomplish the functions of electronic devices 110, 310 may communicate with one another via wired or wireless communications and/or via an intermediary device such as a playback session server.

In some implementations, the electronic devices 110, 310 include a position tracking instruction set to track a position of a content creator or viewer (e.g., user 102, 302, or his/her device 110, 310, respectively) relative to a 3D environment. This may involve tracking a position or movement of the viewer in a physical environment (e.g., physical environment 100), virtual environment, or XR environment. Position, including 2D or 3D coordinate information or orientation, may be tracked based on information from I/O device(s) and sensor(s) or image sensor system(s). In some implementations, the position tracking instruction set is executed to evaluate images of a physical environment, recognize objects in the physical environment, and determine a viewer position relative to the objects in the physical environment. In some implementations, the viewer position is additionally or alternatively tracked using an inertial measurement unit (IMU), an accelerometer, a magnetometer, or a gyroscope. In some implementations, a visual inertial odometry (VIO) technique or a simultaneous localization and mapping (SLAM) technique is applied to track viewer position. In some implementations, the position tracking instruction set implements a machine learning model that uses image data or sensor data to track viewer position.

According to some implementations, the electronic devices 110, 310 generate and present an extended reality (XR) environment to one or more users during a playback session. In contrast to a physical environment that people can sense and/or interact with without aid of electronic devices, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 6:
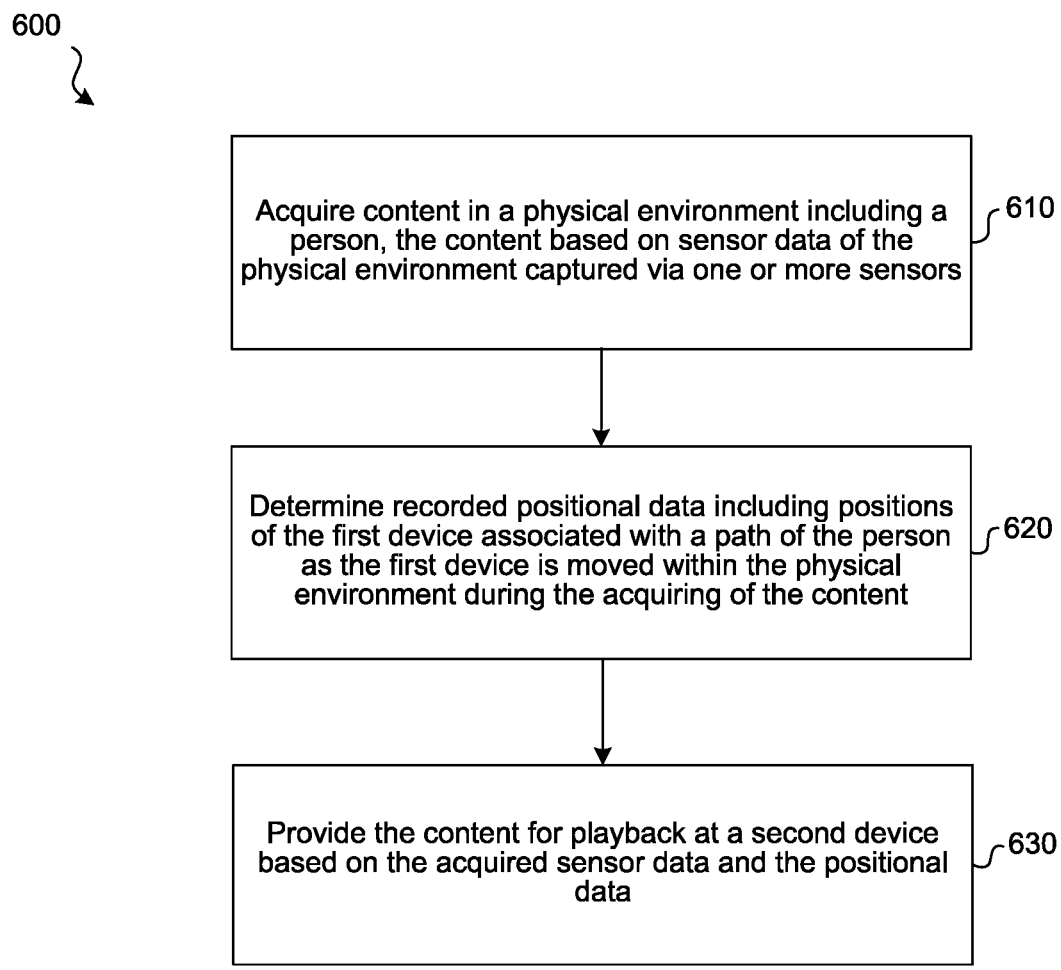
FIG. 6 is a flowchart illustrating a method for recording content and positional data to create a path for playback in accordance with some implementations.

FIG. 6 is a flowchart illustrating a method 600 for recording content and positional data to create a path for playback in accordance with some implementations. In some implementations, a device, such as electronic device 110 or electronic device 310, or a combination of the two, performs method 600. In some implementations, method 600 is performed on a mobile device, desktop, laptop, HMD, ear-mounted device or server device. The method 600 is performed by processing logic, including hardware, firmware, software, or a combination thereof. In some implementations, the method 600 is performed on a processor executing code stored in a non-transitory computer-readable medium (e.g., a memory).

At block 610, at a first device (e.g., a creator's device such as device 110) having a processor, the method 600 acquires content in a physical environment including a person, the content based on sensor data of the physical environment captured via the one or more sensors. The content may include acquiring a video or other time-based content. The person may be a speaker being tracked by a recording device. In some implementations, the sensor data may capturing skeletal pose information/estimation of the person relative to the physical environment to know what the speaker has done relative to the physical location (e.g., a museum). In some implementations, the sensor data may include voice/audio of a speaker.

In some implementations, the sensor data may include obtaining spatial data of a scene in the physical environment (e.g., 3D point cloud data). Additionally, or alternatively, the content may be recorded and/or generated using multiple devices of multiple users.

At block 620, the method 600 determines recorded positional data including positions of the first device associated with a path of the person as the first device is moved within the physical environment during the acquiring of the content, wherein the recorded positional data was obtained via the one or more sensors while acquiring the content. For example, the positional data may include the pose of the device and/or viewing direction of the person (e.g., using device 310). In one example, the positional data identifies 6 degrees of freedom positional information of a person within the physical environment, e.g., where the speaker is standing, which direction the speaker is facing, etc. In one example, the person or creator may be a docent recording a tour in a museum while holding a device that records images of the speaker giving the tour as well as positional data about the person as the he or she gives the tour, which is being recorded. The recorded content and positional data may be associated with one another for later use generating 3D content such as a playback view (e.g., 2D or 3D) of the speaker giving the tour. The use of the recorded content (e.g., images, depth, etc.) and positional data may enable a playback view at the same location and/or orientation within the same physical environment. The positional data may define rooms, space-based bookmarks, space-based playback criteria. The recorded positional data was obtained via one or more sensors on the first device during the recording.

In some implementations, the recorded positional data includes a pose of a viewing direction of the first device. For example, the viewer (e.g., using device 310) can view the same pose and viewing direction as intended by the user that created the content (e.g., a docent using device 110).

In some implementations, determining recorded positional data includes determining estimated pose information of the person relative to the position of the first device in the physical environment. For example, the first device can capture skeletal pose information/estimation relative to the physical environment know what the tour guide has done relative to the museum/physical environment.

In some implementations, the recorded positional data includes spatially-based bookmarks associated with the physical environment. For example, as the speaker walks around a room or down a hallway (in a museum), he or she may virtually place virtual notes (bookmarks) around the area that a viewer can select or walk towards to activate the associated recorded content for that particular bookmark. The bookmarks allow the viewer to follow different paths and not just one particular path (e.g., choose your own adventure books, also known as secret path books).

At block 630, the method 600 provides the content for playback at a second device (e.g., the viewer's device) based on the acquired sensor data and the positional data. For example, a visitor in a museum (e.g., a viewer using the second device) can watch the playback of the content created by the docent (e.g., a creator using the first device).

In some implementations, providing the content for playback includes providing a representation of the person in place of a view of the person (e.g., an avatar). In some implementations, the representation of the person (e.g., an avatar) is based on physiological data of the person obtained via the one or more sensors. For example, physiological sensors (e.g., heart rate, eye gaze, etc.) can detect the person (e.g., the docent recording a museum tour) is happy and therefore the generated avatar can mimic a person as smiling/happy. In some implementations, at least a portion of the person includes facial movements as the first device is moved within the physical environment during the acquiring of the content, and the representation of the person mimics the facial movements. For example, camera sensors can detect the person (e.g., the docent recording a museum tour) is smiling and therefore the generated avatar can mimic the smile.

In some implementations, the system can obtain a relatively higher quality avatar before viewing the content, but the avatar may be presented in relatively less quality based on the viewing device or based on the quality associated with the capture device. In an exemplary implementation, providing the content for playback includes providing different viewing modes based on playback capabilities of the second device. Additionally, or alternatively, in some implementations, providing the content for playback includes providing different viewing modes based on a recording quality of the first device.

In some implementations, presenting the playback of the content includes providing guiding indicators (e.g., indicator 350 of FIG. 3) to guide a viewer (e.g., user 302) to move the second device (e.g., device 310) to a new position associated with the path of the person. The guiding indicators may include bookmarks, footprints, arrows, etc. In some implementations, the guiding indicators include a spatialized audio element that guides the viewer to the new position (e.g., "please move the next painting to your right").

In some implementations, the content includes audio associated with the path of the object (e.g., the representation 122 of user 102, such as a docent talking during the guided tour) and presenting the playback of the content includes playback of the audio associated with the path of the person. For example, spatialized audio may include a creator (a docent) narrating while recording the experience in the museum (e.g., "Look over here and you'll see X.").

In some implementations, the content is generated based on recorded data from the first device and recorded data from a plurality of other devices. In some implementations, the first device and/or the second device is a HMD.

Figure 7:
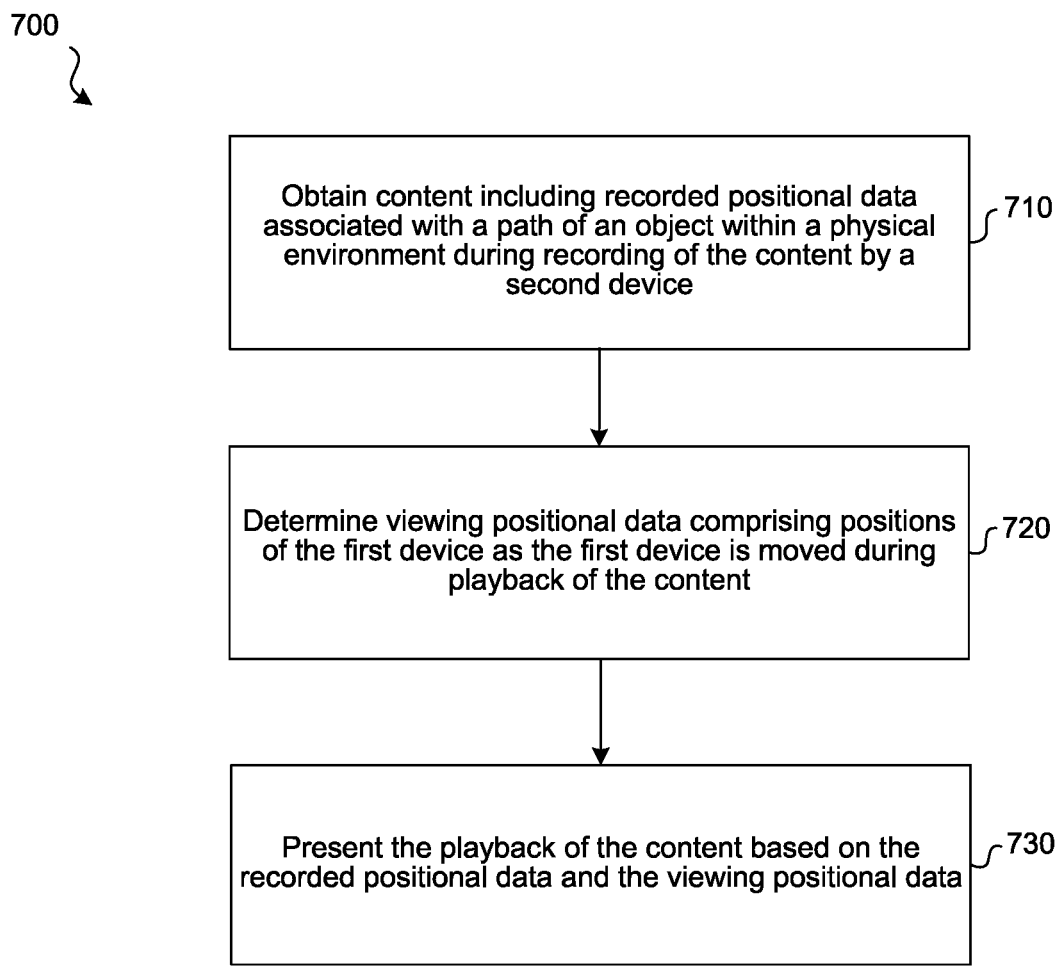
FIG. 7 is a flowchart illustrating a method for presenting playback of content based on recorded positional data and viewing positional data in accordance with some implementations.

FIG. 7 is a flowchart illustrating a method 700 for presenting playback of content based on recorded positional data and viewing positional data in accordance with some implementations. In some implementations, a device, such as electronic device 110 or electronic device 310, or a combination of the two, performs method 700. In some implementations, method 700 is performed on a mobile device, desktop, laptop, HMD, ear-mounted device or server device. The method 700 is performed by processing logic, including hardware, firmware, software, or a combination thereof. In some implementations, the method 700 is performed on a processor executing code stored in a non-transitory computer-readable medium (e.g., a memory).

At block 710, at a first device (e.g., a viewer's device such as device 310) having a processor, the method 700 obtains content (e.g., an avatar, a video, or other time-based content) including recorded positional data associated with a path of an object within a physical environment during recording of the content by a second device (e.g., a creator's device such as device 110). The recorded positional data was obtained via one or more sensors on the second device during the recording. For example, the object may be the second (e.g., recording) device or a person or object tracked by the recording device. The position data may include the pose of the device and/or viewing direction of the creator/docent. The positional data may define rooms, space-based bookmarks, space-based playback criteria. Additionally, or alternatively, the content may be recorded and/or generated using multiple devices of multiple users.

In some implementations, the object is the second device. In some implementations, the object is a person (e.g., a docent such as user 102) or another object that is tracked by the one or more sensors on the second device (e.g., device 110).

In some implementations, the recorded positional data includes a pose of a viewing direction of the second device. For example, the viewer (e.g., using device 310) can view the same pose and viewing direction as intended by the user that created the content (e.g., a docent using device 110).

In some implementations, the recorded positional data includes spatially-based bookmarks associated with the physical environment. For example, as the viewer walks around a room or down a hallway (in a museum), there may be virtual notes (bookmarks) placed around the area that the user can select or walk towards to activate the associated recorded content for that particular bookmark. The bookmarks allow the user to follow different paths and not just one particular path (e.g., choose your own adventure books, also known as secret path books).

In some implementations, the content is generated based on recorded data from the second device and recorded data from a plurality of other devices. In some implementations, the first device and/or the second device is a HMD.

At block 720, the method 700 determines viewing positional data including positions of the first device (viewer's device) as the first device is moved (e.g., within the same physical environment) during playback of the content. For example, the positional data may include the pose of the device and/or viewing direction of the viewer (e.g., walking in a museum). The positional data may define rooms, space-based bookmarks, space-based playback criteria.

At block 730, the method 700 presents the playback of the content based on the recorded positional data and the viewing positional data. For example, a visitor in a museum (e.g., a viewer using the first device) can watch the playback of the content created by the docent (e.g., a creator using the second device). The playback may provide the ability to control the playback based on whether the viewer is on/within a threshold distance from the path, moving forward/back on the path, etc. If the user walks off the path, the playback may pause or disappear and options for alternative recordings/memories may be presented. In some implementations, the viewer can add to the recorded content providing a new way of generating collaborative content.

In some implementations, presenting the playback of the content includes determining a distance between the positions of the first device and the path, and presenting the playback of the content based on the determined distance exceeding a threshold. For example, the playback may pause, rewind, continue, etc. based on whether the viewer is on/within a threshold distance from the path, moving forward/back on the path, etc. If the user walks off the path, the playback may pause or disappear and options for alternative recordings/memories may be presented. In some implementations, presenting the playback of the content is further based on user input. In some implementations, presenting the playback of the content includes providing additional content associated with a different path of another object.

In some implementations, presenting the playback of the content includes displaying guiding indicators (e.g., indicator 350 of FIG. 3) to guide a viewer (e.g., user 302) to move the first device (e.g., device 310) to a new position associated with the path of the object. The guiding indicators may include bookmarks, footprints, arrows, etc. In some implementations, the guiding indicators include a spatialized audio element that guides the viewer to the new position (e.g., "please move the next painting to your right").

In some implementations, the content includes audio associated with the path of the object (e.g., the representation 122 of user 102, such as a docent talking during the guided tour) and presenting the playback of the content includes playback of the audio associated with the path of the object. For example, spatialized audio may include a creator (a docent) narrating while recording the experience in the museum (e.g., "Look over here and you'll see X.").

In some implementations, there are multiple viewing modes for the playback of content (e g., snow globe 3D, over the shoulder view 2D, etc.). In an exemplary implementation, the playback of the content is presented in a first presentation mode, the method 700 further includes, in accordance with a determination to switch the first presentation mode to a second presentation mode, presenting the playback of the content in the second presentation mode. For example, based on user input, the viewer (user 302) selects a snow globe 3D or over the shoulder view 2D, etc.

In some implementations, the playback of content may be augmented with virtual content such as prisoners behind the bars at Alcatraz, a virtual docent (guide), etc. In an exemplary implementation, the playback of the content includes virtual content associated with the content that is presented within a view of the physical environment. In some implementations, the virtual content includes a virtual avatar (e.g., docent) that guides a viewer to move the first device to a new position associated with the path of the object.

In some implementations, the playback of content may include an interactive element (e.g., a selectable virtual icon, or a drop-down menu with a list of items). For example, an interactive element (or several different elements) may allow a user to control different portions of the experience via user input. For example, the user can stop, pause, rewind, fast forward, skip a chapter, etc., through a particular portion of content. Additionally, or alternatively, the user can use voice control to interact with the interactive elements or to control the viewing of the content during the experience (e.g., "skip this portion of the museum tour.").

In some implementations, the playback of content may allow a user to update user settings to indicate that the user may be mobility limited (e.g., in a wheelchair), and therefore cannot proceed directly along the intended path. For example, a distance threshold may be removed or altered if the user can't follow the path exactly as intended because he or she needed to follow a handicap path (e.g., going down a ramp instead of the stairs that the docent used during the tour of the museum). Additionally, or alternatively, the user settings may allow a user to let the system know there maybe too many people that are blocking the intended path, or other environmental blockers that the user needs to navigate and deviate from the intended path. Alternatively, the electronic device 310 can automatically determine that there are environmental blockers (e.g., a crowded event) that requires the user to deviate from the path (e.g., via image data and an object detection algorithm).

In some implementations, there may be playback criteria such as user-controlled rules and thresholds. For example, this chapter should only play when the viewer is in this room, when the user is closest to this bookmark, when the user is within 10 feet of the path, when the user is looking in this direction, etc. In an exemplary implementation, the recorded positional data includes playback criteria associated with the physical environment and the playback of the content is based on the playback criteria.

Figure 8:
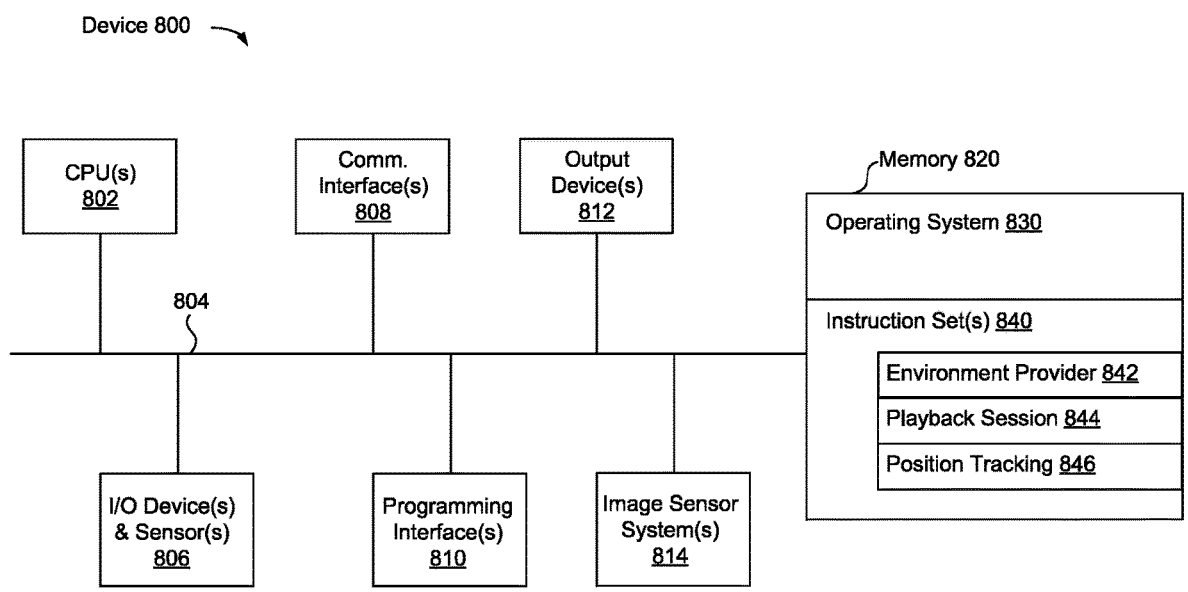
FIG. 8 is a block diagram of an electronic device in accordance with some implementations.

FIG. 8 is a block diagram of electronic device 800. Device 800 illustrates an exemplary device configuration for electronic device 110 or electronic device 310. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUS, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more output device(s) 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 812 include one or more displays configured to present a view of a 3D environment to the user. In some implementations, the one or more output device(s) 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 800 includes a single display. In another example, the device 800 includes a display for each eye of the user.

In some implementations, the one or more output device(s) 812 include one or more audio producing devices. In some implementations, the one or more output device(s) 812 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 812 may additionally or alternatively be configured to generate haptics.

In some implementations, the one or more image sensor systems 814 are configured to obtain image data that corresponds to at least a portion of a physical environment. For example, the one or more image sensor systems 814 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include an environment provider instruction set 842 configured to, upon execution, provide a view of a 3D environment, for example, during a playback session, as described herein. The instruction set(s) 840 further include a playback session instruction set 844 configured to, upon execution, determine to provide a playback session within a view of a 3D environment as described herein. The instruction set(s) 840 further include a position tracking instruction set 846 configured to, upon execution, track a position of a content creator or viewer (e.g., the user 102, 302, or his/her device 110, 310, respectively) relative to a 3D environment. The instruction set(s) 840 may be embodied as a single software executable or multiple software executables.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a first device having a processor:
   obtaining content comprising recorded positional data associated with a path of an object as the object moves within a physical environment during recording of the content by a second device, wherein the recorded positional data was obtained via one or more sensors on the second device during the recording;
   determining viewing positional data comprising positions of the first device as the first device is moved during playback of the content; and
   presenting the playback of the content as the first device is moved, wherein the playback of the content is based on the recorded positional data associated with the path of the object as the object moved within the physical environment during recording of the content and the viewing positional data, wherein the playback of the content includes guiding indicators associated with the path of the moving object within the physical environment.

2. The method of claim 1, wherein presenting the playback of the content as the first device is moved comprises:
   determining a distance between the positions of the first device and the path of the object as the object moves; and
   presenting the playback of the content based on the determined distance exceeding a threshold.

3. The method of claim 1, wherein presenting the playback of the content as the first device is moved is further based on user input.

4. The method of claim 1, wherein presenting the playback of the content as the first device is moved comprises presenting additional content associated with a different path of another object.

5. The method of claim 1, wherein the guiding indicators guide a viewer to move the first device to a new position associated with the path of the object as the object moves.

6. The method of claim 1, wherein the guiding indicators include a spatialized audio element that guides a viewer to a new position.

7. The method of claim 1, wherein the content comprises audio associated with the path of the object as the object moves and presenting the playback of the content as the first device is moved comprises playback of the audio associated with the path of the object as the object moves.

8. The method of claim 1, wherein the playback of the content as the first device is moved is presented in a first presentation mode, the method further comprising:
in accordance with a determination to switch the first presentation mode to a second presentation mode, presenting the playback of the content in the second presentation mode.

9. The method of claim 1, wherein the playback of the content as the first device is moved comprises virtual content associated with the content that is presented within a view of the physical environment.

10. The method of claim 9, wherein the virtual content comprises a virtual avatar that guides a viewer to move the first device to a new position associated with the path of the object as the object moves.

11. The method of claim 1, wherein the object is the second device.

12. The method of claim 1, wherein the object is a person or another object that is tracked by the one or more sensors on the second device.

13. The method of claim 1, wherein the recorded positional data comprises a pose of a viewing direction of the second device.

14. The method of claim 1, wherein the recorded positional data comprises spatially-based bookmarks associated with the physical environment.

15. The method of claim 1, wherein the recorded positional data comprises playback criteria associated with the physical environment and the playback of the content is based on the playback criteria.

16. The method of claim 1, wherein the content is generated based on recorded data from the second device and recorded data from a plurality of other devices.

17. The method of claim 1, wherein the playback of the content as the first device is moved is presented in an extended reality (XR) environment.

18. The method of claim 1, wherein the first device or the second device is a head-mounted device (HMD).

19. The method of claim 1, wherein the content comprises an image, video, or 3D reconstruction of the physical environment obtained via the one or more sensors on the second device during the recording.

20. The method of claim 1, wherein the content comprises one or more virtual objects associated with the physical environment.

21. The method of claim 1, wherein the content comprises a representation of a user of the second device during the recording.

22. A first device comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the one or more processors to perform operations comprising:
   obtaining content comprising recorded positional data associated with a path of an object as the object moves within a physical environment during recording of the content by a second device, wherein the recorded positional data was obtained via one or more sensors on the second device during the recording;
   determining viewing positional data comprising positions of the first device as the first device is moved during playback of the content; and
   presenting the playback of the content as the first device is moved, wherein the playback of the content is based on the recorded positional data associated with the path of the object as the object moved within the physical environment during recording of the content and the viewing positional data, wherein the playback of the content includes guiding indicators associated with the path of the moving object within the physical environment.

23. The first device of claim 22, wherein presenting the playback of the content as the first device is moved comprises:
    determining a distance between the positions of the first device and the path of the object as the object moves; and
    presenting the playback of the content based on the determined distance exceeding a threshold.

24. The first device of claim 22, wherein presenting the playback of the content as the first device is moved is further based on user input.

25. A non-transitory computer-readable storage medium storing program instructions executable via one or more processors to perform operations comprising:
    obtaining content comprising recorded positional data associated with a path of an object as the object moves within a physical environment during recording of the content by a second device, wherein the recorded positional data was obtained via one or more sensors on the second device during the recording;
    determining viewing positional data comprising positions of a first device as the first device is moved during playback of the content; and
    presenting the playback of the content as the first device is moved, wherein the playback of the content is based on the recorded positional data associated with the path of the object as the object moved within the physical environment during recording of the content and the viewing positional data, wherein the playback of the content includes guiding indicators associated with the path of the moving object within the physical environment.

* * * * *